No. 708,448. Patented Sept. 2, 1902.

A. O. WYMAN.
OILING DEVICE.
(Application filed Nov. 23, 1901.)

(No Model.)

WITNESSES

INVENTOR
Albert O. Wyman
BY
ATTORNEYS

UNITED STATES PATENT OFFICE.

ALBERT OREN WYMAN, OF TURNERS FALLS, MASSACHUSETTS, ASSIGNOR OF ONE-HALF TO CYRUS L. GLYNN, OF BOSTON, MASSACHUSETTS.

OILING DEVICE.

SPECIFICATION forming part of Letters Patent No. 708,448, dated September 2, 1902.

Application filed November 23, 1901. Serial No. 83,382. (No model.)

*To all whom it may concern:*

Be it known that I, ALBERT OREN WYMAN, a citizen of the United States, residing at Turners Falls, in the county of Franklin and State of Massachusetts, have invented certain new and useful Improvements in Oiling Devices, of which the following is a full and complete specification, such as will enable those skilled in the art to which it appertains to make and use the same.

The object of this invention is to provide an improved oiling device particularly designed for use in oiling loose pulleys or other pulleys or devices mounted on a shaft or axle; and with this and other objects in view the invention consists in an oiling device constructed as hereinafter described and claimed.

Figure 1:
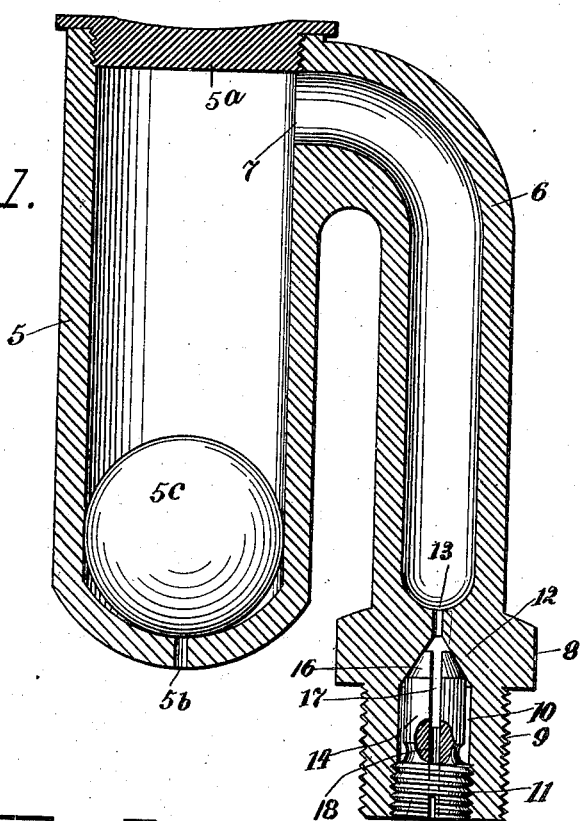
Figure 2:
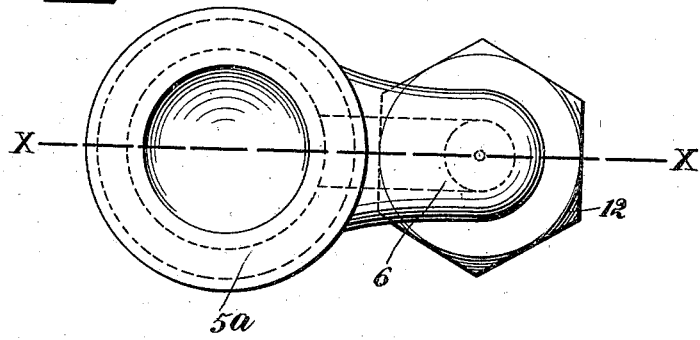

In the drawings forming part of this specification, in which the separate parts of my improvement are designated by the same reference characters in each of the views, Figure 1 is a central longitudinal section of my improved oiling device, the section being taken on the line *x x* of Fig. 2; and Fig. 2, a plan view of the device as shown in Fig. 1.

In the practice of my invention I provide a cylindrical cup or receptacle 5, provided with a screw-threaded cap 5ª and in the bottom thereof with a vent 5ᵇ, and placed in the said cylindrical cup or receptacle is a ball 5ᶜ, the diameter of which is substantially the same as the inner diameter of the cup or receptacle 5, and said ball may be composed of metal or any desired material of considerably greater specific gravity than oil. The cup or receptacle 5 is provided at one side thereof near the removable cap 5ª with a tubular member 6, which communicates therewith at 7 and which ranges parallel with the cylindrical cup or receptacle 5, and is provided near the end thereof with an angular enlargement 8 and a screw-threaded tubular extension 9 at the end thereof, within which is a cylindrical bore 10, screw-threaded at its outer end, as shown at 11, and provided at its inner end with a conical valve-seat 12, and the bore 10 is in communication with the tubular member 6 by means of a port or passage 13. Within the bore 10 is placed an oil-discharge-regulating plug 14, the outer end of which is enlarged and screw-threaded, as shown at 15, and the inner end of which is formed into a conical valve 16, which is split longitudinally, as shown at 17, and by screwing the plug tightly into the bore 10 the split conical valve or the separate parts thereof will be forced together by the conical valve-seat, and the amount of oil discharged, as hereinafter described, may be thus regulated. The plug 14 is also provided with a longitudinal bore or passage 18, and the screw-threaded end thereof is provided with a transverse slot or groove 19 in the manner of the head of an ordinary screw, whereby the plug may be screwed into position by an ordinary screwdriver.

My improved oiling device is particularly adapted for use in connection with a loose pulley or similar device, and in practice the screw-threaded extension 9 of the tubular member 6 is screwed into a suitable hole formed in the hub of the pulley or other device. The cap 5ª is then removed and the receptacle 5 filled with oil, after which the cap is screwed into position. As the pulley revolves, the specific gravity of the ball being greater than that of the oil, the centrifugal force occasioned by the revolution of the pulley will throw the ball out toward the cap 5ª and force the oil through the tubular member 6, and said oil will pass through the port or passage 13 through the plug 14 into the hub of the pulley or onto the shaft or axle on which the pulley is placed, thus thoroughly lubricating said parts when the pulley is in operation.

The vent 5ᵇ in the bottom of the cup or receptacle 5 is intended to prevent a vacuum in the inner end of said cup or receptacle in the operation of the ball 5ᶜ, as hereinbefore described.

My improved oiling device is simple in construction and operation and perfectly adapted to accomplish the result for which it is intended and may be applied to any revoluble member mounted on a shaft or axle and provided with a hub.

Having thus fully described my invention, what I claim as new, and desire to secure by Letters Patent, is—

An oiling device comprising a cylindrical cup or receptacle open at one end and provided with a removable cap, a spherical ball or body placed in said cup or receptacle a tubular member connected with one side of said cup or receptacle, near the cap end thereof and ranging parallel with and slightly longer than said cup or receptacle, the free end of said tubular member being provided with a valve-seat and a port or passage formed therein, and means for regulating the flow of oil through said port or passage, consisting of a split screw-threaded plug having a conical end and a port or passage, substantially as shown and described.

In testimony that I claim the foregoing as my invention I have signed my name, in presence of the subscribing witnesses, this 9th day of November, 1901.

ALBERT OREN WYMAN.

Witnesses:
MYRON B. ALLEN,
FRED E. ALLEN.